United States Patent
Bonucci et al.

(10) Patent No.: US 8,864,886 B2
(45) Date of Patent: Oct. 21, 2014

(54) COMPOSITE GETTERS

(71) Applicant: SAES Getters S.p.A., Lainate (IT)

(72) Inventors: Antonio Bonucci, Milan (IT); Paolo Vacca, Milan (IT)

(73) Assignee: SAES Getters S.p.A., Lainate (MI) (IT)

( * ) Notice: Subject to any disclaimer, the term of this patent is extended or adjusted under 35 U.S.C. 154(b) by 0 days.

(21) Appl. No.: 14/347,812

(22) PCT Filed: Oct. 25, 2012

(86) PCT No.: PCT/IB2012/055867
§ 371 (c)(1),
(2), (4) Date: Mar. 27, 2014

(87) PCT Pub. No.: WO2013/064945
PCT Pub. Date: May 10, 2013

(65) Prior Publication Data
US 2014/0230656 A1    Aug. 21, 2014

(30) Foreign Application Priority Data
Nov. 3, 2011  (IT) ............................... MI2011A1987

(51) Int. Cl.
*B01D 53/04* (2006.01)
*H01J 7/18* (2006.01)

(52) U.S. Cl.
CPC ................ *B01D 53/04* (2013.01); *H01J 7/183* (2013.01)
USPC .............................................. 96/154; 96/108

(58) Field of Classification Search
CPC .. C01B 3/0031; C01B 3/508; C01B 21/0483; C22C 16/00; C22C 1/0458; H01J 7/183; Y02E 60/327
USPC ........................................................... 96/154
See application file for complete search history.

(56) References Cited

U.S. PATENT DOCUMENTS

| | | |
|---|---|---|
| 4,306,887 A | 12/1981 | Barosi et al. |
| 4,312,669 A | 1/1982 | Boffito et al. |
| 4,630,095 A | 12/1986 | Otsuka et al. |
| 4,668,424 A | 5/1987 | Sandrock |
| 4,839,085 A | 6/1989 | Sandrock et al. |
| 5,180,568 A | 1/1993 | Boffito et al. |
| 5,324,172 A | 6/1994 | Ferrario et al. |
| 5,556,603 A | 9/1996 | Lormier et al. |
| 5,753,014 A * | 5/1998 | Van Rijn ............................ 96/12 |
| 5,814,241 A | 9/1998 | Manegin et al. |

(Continued)

FOREIGN PATENT DOCUMENTS

| | | |
|---|---|---|
| EP | 869195 | 10/1998 |
| EP | 1285100 | 2/2003 |
| WO | 01/92590 | 12/2001 |
| WO | 2007/080614 | 7/2007 |
| WO | 2010/105944 | 9/2010 |
| WO | 2010/105945 | 9/2010 |

OTHER PUBLICATIONS

PCT International Search Report mailed on Dec. 7, 2012 for PCT/IB2012/055867 filed on Oct. 25, 2012 in the name of SAES Getters S.P.A.

(Continued)

*Primary Examiner* — Christopher P Jones
(74) *Attorney, Agent, or Firm* — Steinfl & Bruno LLP

(57) ABSTRACT

A composite getter system is described. The system has NEG materials coated with a polyimide or polyamide based compound.

18 Claims, 2 Drawing Sheets

(56) References Cited

U.S. PATENT DOCUMENTS

| | | | |
|---|---|---|---|
| 5,961,750 A | 10/1999 | Boffito et al. | |
| 6,521,014 B2 | 2/2003 | Toia et al. | |
| 6,673,400 B1 * | 1/2004 | Bedinger et al. | 428/34.1 |
| 7,589,465 B2 | 9/2009 | Carr | |
| 2004/0189195 A1 | 9/2004 | Allemand | |
| 2008/0257401 A1 | 10/2008 | Laurvay et al. | |

OTHER PUBLICATIONS

PCT Written Opinion mailed on Dec. 7, 2012 for PCT/IB2012/055867 filed on Oct. 25, 2012 in the name of SAES Getters S.P.A.

PCT International Preliminary Report on Patentability mailed on Oct. 15, 2013 for PCT/IB2012/055867 filed on Oct. 25, 2012 in the name of SAES Getters S.P.A.

\* cited by examiner

COMPOSITE GETTERS

CROSS REFERENCE TO RELATED APPLICATIONS

The present application is the US national stage of International Patent Application PCT/IB2012/055867 filed on Oct. 25, 2012 which, in turn, claims priority to Italian Patent Application MI2011A001987 filed on Nov. 3, 2011.

The present invention is directed to improved composite getter systems and devices employing such composite getter systems.

Getters are materials capable of removing gaseous impurities down to very low levels, in the most demanding applications even down to fractions of parts per billion, and have a variety of applications and uses. In the context of the present invention each time the term getter is used is to be interpreted in the technical meaning of Non Evaporable Getter, i.e. a material that remains in its solid state also at the operating temperatures thereof, as well as at the much higher temperatures used for its activation or re-activation processes.

With regard to Non Evaporable Getter alloys, known in the technical field with the NEG acronym, their uses range from gas purification for the semiconductor industry, as for example described in U.S. Pat. No. 5,556,603 in the applicant's name, to the control of the vacuum level in process chambers via getter pumps, as for example described in U.S. Pat. No. 5,324,172 in the applicant's name, to the control of the vacuum level or the purity of the atmosphere in sealed devices, such as lamps, as described in the European patent No. 869,195 in the applicant's name.

Even though the use of the getter materials in such applications is well established, there is a continuous need and request to improve the characteristics of the materials or the way they are integrated in systems, see for example what disclosed in the International patent application publication WO 2010/105944 in the applicant's name on an improved pumping system envisioning the use of a getter pump, or what disclosed in the International publication WO 2010/105945, in the applicant's name, on an improved getter alloy particularly suitable for hydrogen sorption.

As mentioned, there is a constant need to improve the features and characteristics of getter materials, for example by imparting them auxiliary properties or features enabling their successful employment in new applications.

In this regard U.S. Pat. No. 7,589,465 shows a hybrid getter, consisting of getter material powders mixed with a polyimide resin, whose advantageous characteristic is its capability to be easily dispensed with standard techniques such as screen printing or inkjet printing, while the problem of the compatibility between getter materials and other components of electronic devices, such as conductive lines, is addressed in U.S. Pat. No. 7,589,465, disclosing the use of getter protective layers as intermediate element between the device components and the getter materials. U.S. Pat. No. 4,630,095 discloses the use of a getter material with a thick organic layer, in the order of tens of micron, in direct contact with a semiconductor chip, with a layer of getter material disposed over it with the aim of increasing the protection of the device.

Getter systems compatible with electrolytic environments are instead described in the International patent application WO 2007/080614 in the applicant's name. In this case it is provided the use of a polymeric based container in order to avoid the contact between the getter material and the electrolyte.

An additional property not addressed in any of the previously cited prior art documents is the capability of the getter material to withstand exposure to air for certain amounts of time without a significant impairing of its absorption properties.

This property for example allows to use the getter material in processes where it is not exposed to a clean environment and where a re-activation process, that typically includes its heating at high temperatures, is not compatible with the device, or alternatively, allows to simplify the device manufacturing process while avoiding the need to re-activate the getter material.

Processes where the getter re-activation poses serious drawbacks are for example the ones involving glass-to-glass sealing (mechanical stresses in the structure), while exemplary devices are organic based ones (high temperature compatibility problems of the organic material).

Moreover, in some cases, another additional feature that is of interest is to have getter based solutions to be used in a sealed Nitrogen environment to remove other gaseous impurities, such as oxygen, but whose capacity is not impaired by the presence of Nitrogen, since getter materials may exhibit a strong interaction with this gas: see for example what disclosed in the European patent EP 1,285,100 in the applicant's name.

These advantages are obtained with the present invention, that in a first aspect thereof consists in a composite getter system comprising one or more NEG materials and one or more polyimide or polyamide based compounds characterized in that at least 80% of the NEG materials surface facing the environment is coated with said polyimide or polyamide based compounds and said coating has a thickness comprised between 0.1 and 1 mm. In a preferred embodiment the polyimide or polyamide based compound coating has a thickness comprised between 0.2 and 0.5 mm.

The invention will be further illustrated through the aid of the annexed drawings, wherein.

Figure 2:
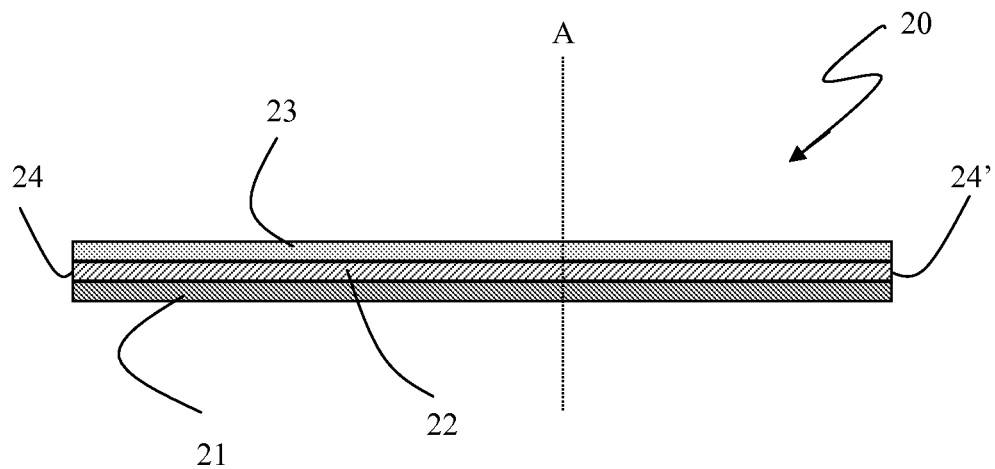
FIG. 2 shows a frontal view of a second embodiment of a getter system according to the present invention.

In the figures the dimensions and the dimensional ratios relating to the elements therein depicted, with particular and non exclusive reference to the layer thicknesses in FIG. 2, may not been correct and in some cases have been altered in order to improve the figure comprehension.

With the term environment it is intended the empty ambient surrounding the getter system, typically once the composite getter system according to the present invention is put in place within a device. This is a closed and confined space under vacuum or sealed in an inert gas atmosphere, while during the device manufacturing phase it could be considered the ambient air.

In particular the inventors have found that, although the coating of the getter material surface facing the environment with a layer of a polyimide or polyamide based compound is beneficial in terms of preserving the getter material activity in air, such coating does not provide any further advantage for thicknesses higher than 1 mm, but in such case an unexpected detrimental effect is observed in terms of prolonged getter activation times, and in the most extreme cases, for thicknesses higher than 5 mm, such coating may even poison the getter material causing a reduction in its capacity.

This solution is therefore completely different from that shown in U.S. Pat. No. 4,630,095 that addresses a different technical problem, in fact in this case the getter material is directly facing the environment, again intended as the gaseous (such as inert, vacuum) atmosphere within the device, and moreover shows systems where the organic layer has a thickness of at least 10 µm.

With regard to the characteristics of the polyimide or polyamide coating it is preferred to have a coating that has a uniform thickness, i.e. the difference between the maximum and the minimum thickness is equal or less than 0.1 mm.

Also in a preferred embodiment, the NEG material surface facing the environment is fully coated.

In the getter systems according to the present invention it is important that the polyimide or polyamide coating acts as main interface between the NEG material and the external environment, intended that at least 80% of the surface of the NEG material directly facing the external environment is covered by the polyimide or polyamide coating. The previous definition takes into account the fact that the getter system may comprise a support, that in this case has the double function of holding the NEG material and the relevant overlaying coatings of polyamide/polyimide and of shielding the getter material from the external environment.

Figure 1:
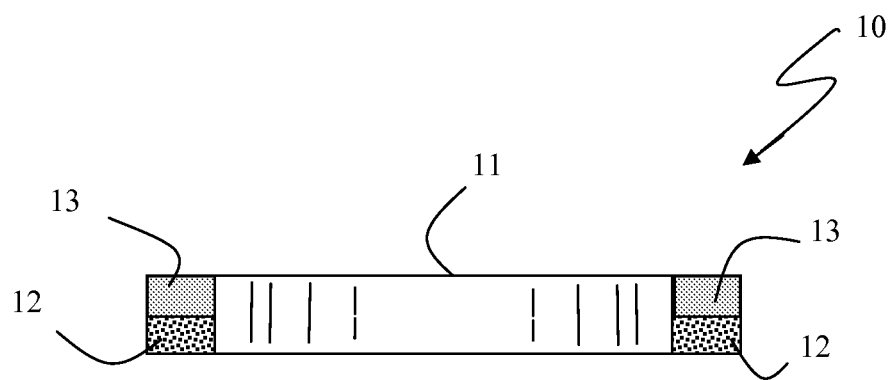
FIG. 1 shows a frontal view of a first embodiment of a getter system according to the present invention.

This type of technical solution is depicted in FIG. 1, showing a getter system 10 where, on the bottom of a ring shaped metallic support 11, there are present compressed powders 12 of a NEG material, over which a coating of a polyimide or polyamide compound, indicated with the numeral 13 is provided.

A similar solution but with the polyimide/polyamide coating leaving directly exposed to the environment a small amount of the NEG material is shown in FIG. 2. In this case the getter system 20 comprises a flat metallic support 21 over which it is present the getter material 22 in the form of a metallic layer, coated with a polyimide/polyamide layer 23. The metallic support 21 is of indefinite length, meaning that in this case it is possible to cut it to the desired length, as simplified by the vertical line A showing a possible cutting point. Therefore these types of getter systems show small portions of getter material whose surfaces are not in contact either with the support, 21 or the coating layer. These are the boundaries lateral surfaces 24, 24', or surface boundaries created by the cutting actions. Those surfaces are minimal with respect to the coated portion, that according to the present invention should be at least 80% of the surface of the getter material facing the external environment, this meaning e.g. that in the present case the surface of the getter material in direct contact with the support is not taken into account when considering the percentage ratio with the surface coated fraction.

Figure 3:
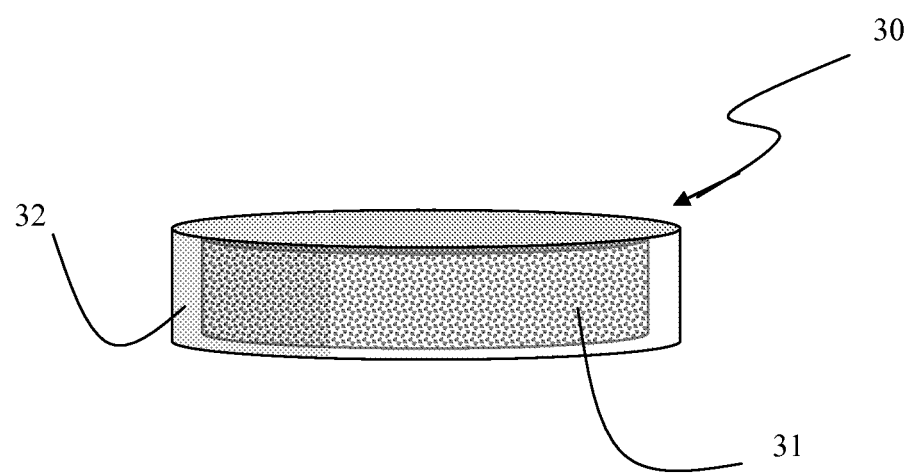
FIG. 3 shows a perspective view of a third embodiment of a getter system according to the present invention.

A third embodiment of a getter system according to the present invention is shown in FIG. 3, In this case the getter system 30 is made by a pill of getter material 31 completely enclosed by a surrounding coating of polyimide or polyamide material 32.

The preferred mode of employment of the NEG materials is in the form of powders or in the form of thin films. In the case of powders their granulometry is preferably below 500 µm. With powder granulometry it is intended the maximum lateral dimension of the powders, this definition taking also into account that the powders may not have a regular (i.e. spherical) shape. When the NEG materials are used in the form of films, their thickness is advantageously comprised between 0.5 µm and 300 µm, and more preferably between 1 µm and 200 µm. Such films may be obtained by sputtering or by sintering layers of powders, in this case by using powders with finer granulometry (less than 100 µm).

For the composite NEG getter system shown in FIG. 1 the preferred mode of use of the NEG material is in the form of compressed powders, for the system of FIG. 2, it is equivalent to use compressed powders or to deposit a layer of material, while in the case of FIG. 3 the pills are preformed, preferably by compression in a suitable mold, and then coated, for example by immersing for a controlled time the pills in a solution of the polyamide/polyimide material.

The NEG materials for carrying out the present invention are Zr, Ti, Y and their alloys and combinations with also other metals, for example V, Al, Ni, Fe, Si, Sb, Co, Mn. In any case it is important that such alloys or combinations contain at least 20 wt % of one element chosen from Zr, Ti, Y (for example a Zr—V—Fe alloy containing at least 20 wt % Zr). The most common and simplest combination between different elements is a mix of their powders.

Particularly preferred is the use of NEG materials that have a low activation temperature, this meaning that a thermal treatment at temperature as high as 450° C. for at least ½ hour is capable to restore to the material a capacity of at least 0.3 cc Torr/gram.

For a NEG with a low activation temperature (a temperature equal or less than 450° C.) the capacity of the composite getter system according to the present invention is the capacity of the NEG material, while for a generic NEG material there are constraints regulating the thermal treatments of the composite getter system that would provide a lower capacity of the composite getter system with respect to the nominal capacity of the NEG material therein contained.

Among the low activation temperature NEG materials, particularly useful to carry out the invention there are the low activation temperature zirconium-based binary alloys/combinations or zirconium comprising multicomponent alloys/combinations. With zirconium-based NEG it is intended binary alloys/combinations with at least 50 wt % Zr, with zirconium comprising alloys/combinations it is intended alloys/combinations containing more than two elements, such as ternary alloys, with at least 20 wt % Zr.

Examples of such Zr-based suitable alloys are described in the following references: U.S. Pat. No. 4,306,887 discloses Zr—Fe alloys and in particular the alloy having weight percent composition Zr 76.6%-Fe 23.4%; U.S. Pat. No. 4,312,669 discloses Zr—V—Fe alloys, and in particular the alloy having weight percent composition Zr 70%-V 24.6%-Fe 5.4%; U.S. Pat. No. 4,668,424 discloses zirconium-nickel-mischmetal alloys with optional addition of one or more other transition metals; U.S. Pat. No. 4,839,085 discloses Zr—V-E alloys, wherein E is an element selected among iron, nickel, manganese and aluminum or a mixture thereof; U.S. Pat. No. 5,180,568 discloses intermetallic compounds Zr-M'-M", wherein M' and M", being identical or different from one another, are selected among Cr, Mn, Fe, Co and Ni, and in particular the compound Zr—Mn—Fe; U.S. Pat. No. 5,961,750 discloses Zr—Co-A alloys wherein A is an element selected among yttrium, lanthanum, Rare Earths or a mixture thereof, and in particular the alloy having the weight percent composition Zr 80.8%-Co 14.2%-A 5%; U.S. Pat. No. 6,521,014 discloses zirconium-vanadium-iron-manganese-mischmetal alloys, and in particular the alloy having weight percent composition Zr 70%-V 15%-Fe 3.3%-Mn 8.7%-MM 3% wherein with MM there is meant mischmetal, i.e. a commercial mixture of Rare Earths, for example having weight percent composition 50% cerium, 30% lanthanum, 15% neodymium, balance 5% of other Rare Earths, or Zr—V—Ti alloys as described in U.S. Pat. No. 5,814,241.

Among those, particularly interesting for manufacturing the composite getters according to the present invention are the ones made employing Zr—Co-A alloys, Zr—V—Fe alloys, Zr—V—Fe—Mn-MM alloys, or, not included in the previous list, Zr—Fe—Y alloys.

Polyamic precursors suitable to carry out the invention are e.g. Polyamic acid of Benzophenone Tetracarboxylic Dianhydride-co-4,4-Oxydianiline/m-Phenylenediamine, Poly (pyromellitic dianhydride-co-4,4'-oxydianiline), Poly(3,3',4, 4'-biphenyltetracarboxylic dianhydride-co-1,4-phenylenediamine), amic acid solution. Polyamic precursors are able to be transformed in polyimides through a condensation reaction of "imidisation".

Polyamides based compounds suitable to carry out the invention are for example, poly(4,4'-oxydiphenylene-pyromellitimide), Poly[imino(1,6-dioxo-1,6-hexanediyl) imino 1,6-hexanediyl] Poly[imino(1-oxo-1,11-undecanediyl)].

Polyimides based compounds suitable to carry out the invention are for example Poly(1,2,3-trimethyl-2,3-dihydro-1,6-indendiyl-1,4-phenylene-ethylene), poly 3,3,4,4' benzophenone tetracarboxylic dianhydride benzidine, poly 3,3, 4,4' benzophenone tetracarboxylic dianhydride phenyldiamine, poly 3,3,4,4' benzophenone tetracarboxylic dianhydride diaminobenzophenone, poly 3,3,4,4' benzophenone tetracarboxylic dianhydride diaminostilbene, poly (pyromellitic dyanhydride benzidine).

In a second aspect thereof the invention is inherent to a gas sensitive device containing a composite getter system according to the present invention.

Basically there are three different types of sensitive devices where the composite getter systems according to the present invention can be usefully employed, each with its own requirements and peculiarities.

A first class of sensitive devices are sealed devices whose performances and characteristics are impaired by the presence of gaseous impurities such as, for example, $N_2$, $O_2$, $H_2O$, CO, $CO_2$ at very low levels. The maximum level tolerable is dependent from the application and the presence of the composite getter systems according to the present invention guarantees that the gaseous load within the closed environment of the sealed device is kept below such maximum level for the requested lifetime of the device.

A particular type of this class of devices are the ones sealed in nitrogen: this type of devices of course is not affected by the presence of Nitrogen but suffers the presence at trace level of other impurities. Typical sensitive devices of this class are electronic devices with metallic components that are oxidized by $O_2$ or corroded by $H_2O$, or organic electronic devices where $O_2$ and $H_2O$ interact with the organic materials altering and degrading their characteristics, typical examples being organic LEDs, thin film photovoltaic modules, organic solar cells, dye sensitized solar cells; for these devices $O_2$ should be kept below 10 ppm.

In case the composite getter system of the present invention needs to be used in a Nitrogen environment for removing other gaseous impurities, such as $O_2$, it is required to passivate the system toward Nitrogen, for example by exposing it in a glove box filled with Nitrogen at room temperature for ½ hour. Such operation does not impair the capability of the composite getter according to the present invention to remove $O_2$.

Another class of sensitive devices are the ones requiring vacuum as means to guarantee the thermal insulation; the most interesting devices of these types are receiver tubes for solar collectors and vacuum insulated glasses (known also with the acronym VIG) that typically require gaseous impurities to be kept below $10^{-3}$ mbar.

Another class of devices shows an internal pressure lower than the atmospheric pressure, and this difference is used as a means for the device sealing. An example of this type of device is given by US patent application No. 2008/257,401. Usually the pressure within these devices is kept at least 100 mbar lower than the atmospheric pressure.

The internal environment is typically filled with Nitrogen, and in this case the purpose of the getter system is to avoid a pressure increase within the closed environment that could affect its sealing. In this case the composite getter has the function to keep the pressure increase, mainly related to oxygen ingress, below 5 mbar.

The invention will be further illustrated with the help of the following non limiting examples.

EXAMPLE 1

The purpose of this test is to show the advantages of the composite getter system according to the present invention, with respect to a configuration where the NEG getters powders are mixed with the polymeric materials, such as in the above mentioned U.S. Pat. No. 7,589,465.

For the composite getter systems testing, the NEG powders are placed on a ring-like support, such as the one shown in FIG. 1. The NEG powders are then covered with a polyimide layer, poly(4,4'-oxydiphenylene-pyromellitimide), with different thickness. The same type of NEG material and polyimide has been used to prepare comparative samples, in which case instead of coating the NEG powders with the polyimide, the getter material and polyimide are mixed together and then placed within the ring-like support structure. All the samples after their preparation are subjected to a thermal activation treatment by heating in vacuum for 1 hour at 400° C.

In Table 1 there is reported the residual capacity for Nitrogen at room temperature obtained after having exposed the samples, made with a Zr—Co-A alloys, (Zr 80 wt %, Co 15 wt %, A 5 wt %) to air at atmospheric pressure for 10 minutes. The residual capacity is measured by a sorption test, by comparing the reduction in pressure in a constant volume by a newly activated composite getter and a composite getter that has been exposed to air for 10 minutes.

In Table 2 there are shown the results obtained with a Zr—V—Fe alloys (Zr 70 wt %, V 24.6%, Fe 5.4%), in Table 3 the results obtained with a Zr—V—Fe—Mn-MM alloy (Zr 70 Wt %, V 15 wt %, Fe 3.39 wt %, MM 3 wt %) and finally in Table 4 the results obtained with a Zr—Fe—Y alloy (Zr 74 wt %, Fe 16 wt %, Y 10 wt %). In the first columns of these tables the thickness of the polyimide layer is reported when it is deposited as a uniform layer over the getter powders.

TABLE 1

| | Zr—Co—A alloys | |
|---|---|---|
| Polyimide Thickness (mm) | Sample Residual Capacity (%) | Comparative Sample Residual Capacity (%) |
| 0.075 | 0 | 0 |
| 0.2 | 26 | 0 |
| 0.5 | 88 | 3 |
| 1 | 97 | 51 |

TABLE 2

Zr—V—Fe alloys

| Polyimide Thickness (mm) | Sample Residual Capacity (%) | Comparative Sample Residual Capacity (%) |
|---|---|---|
| 0.075 | 0 | 0 |
| 0.2 | 82 | 0 |
| 0.5 | 97 | 52 |
| 1 | 99 | 76 |

TABLE 3

Zr—V—Fe—Mn-MM alloys

| Polyimide Thickness (mm) | Sample Residual Capacity (%) | Comparative Sample Residual Capacity (%) |
|---|---|---|
| 0.075 | 0 | 0 |
| 0.2 | 72 | 0 |
| 0.5 | 96 | 40 |
| 1 | 99 | 70 |

TABLE 4

Zr—Fe—Y alloys

| Polyimide Thickness (mm) | Sample Residual Capacity (%) | Comparative Sample Residual Capacity (%) |
|---|---|---|
| 0.075 | 0 | 0 |
| 0.2 | 76 | 0 |
| 0.5 | 96 | 45 |
| 1 | 99 | 72 |

It is possible to observe that with the composite getter systems according to the present invention there is an improvement in the residual capacity with respect to a "mixed configuration". It should be remarked that a higher residual capacity of more than 25% is very important for two different aspects, i.e. on one side it will allow for the use of less material (also intended as number of getter systems to be used), this being a relevant aspect in small volume applications where the available space is limited, or it will ensure a longer lifetime of the final devices.

Also the previous tests show that there is no beneficial technical effect in employing polyimide overcoating layers with a thickness lower than 0.1 mm, and that the most advantageous effects are achieved with a thickness comprised between 0.2 and 0.5 mm, while for thicknesses higher than 0.5 and up to 1 mm there is a further improvements, but rather marginal.

EXAMPLE 2

In this case comparative samples are prepared by coating Zr—Co-A (Zr 80 wt %, Co 15 wt %, A 5 wt %) alloy powders with different thicknesses of PMMA (polymethylmethacrilate) layer. As in the case of Example 1, the thicknesses of the polymeric coatings ranges from 0.075 up to 1 mm and the samples are subjected to the same activation thermal treatment by heating in vacuum at 400° C. for 1 hour.

The same test described in Example 1 is repeated, by exposing the samples to air at room temperature for 10 minutes, but in this case even with a 1 mm coating there is no residual capacity observed.

EXAMPLE 3

Operating as in the case of Example 2, another series of comparative samples is made, using the same NEG getter alloy powders, and the same thicknesses for the polymeric coating, but in this case by using LDPE as coating material. Also in this case the composite getter does not show any residual capacity for nitrogen after the exposure to air for 10 minutes.

This test shows that the proper selection of the polymeric coating is of fundamental importance to properly tag the technical problem addressed with this invention, since LDPE is the most preferred material described in WO 2007/080614 for getters to be used in electrolytic environments.

The invention claimed is:

1. A gas sensitive device containing a composite getter system, the composite getter system comprising:
   at least one Non-Evaporable Getter (NEG) material device, the at least one NEG material having a surface that faces an empty ambient environment surrounding the composite getter system; and
   at least one polyimide and/or polyamide based compound coating at least 80% of the at least one NEG material's surface, the compound having a thickness comprised between 0.1 and 1 mm.

2. The gas sensitive device containing a composite getter system according to claim 1, wherein said compound has a thickness comprised between 0.2 and 0.5 mm.

3. The gas sensitive device containing a composite getter system according to claim 1, wherein the at least one NEG material's surface facing the environment is fully coated.

4. The gas sensitive device containing a composite getter system according to claim 1, wherein said at least one polyimide or polyamide based compound is uniform.

5. The gas sensitive device containing a composite getter system according to claim 1, wherein said at least one polyimide compound is chosen from poly(1,2,3-trimethyl-2,3-dihydro-1,6-indendiyl-1,4-phenylene-ethylene), poly 3,3,4,4' benzophenone tetracarboxylic dianhydride benzidine, poly 3,3,4,4' benzophenone tetracarboxylic dianhydride phenyldiamine, poly 3,3,4,4' benzophenone tetracarboxylic dianhydride diaminobenzophenone, poly 3,3,4,4' benzophenone tetracarboxylic dianhydride diaminostilbene, and poly (pyromellitic dyanhydride benzidine).

6. The gas sensitive device containing a composite getter system according to claim 1, wherein said at least one polyamide compound is chosen from poly(4,4'-oxydiphenylene-pyromellitimide), and poly[imino(1,6-dioxo-1,6-hexanediyl) imino-1,6-hexanediyl]poly[imino(1-oxo-1,11-undecanediyl)].

7. The gas sensitive device containing a composite getter system according to claim 1, wherein said at least one NEG material is in a form of powders with a granulometry equal to or less than 500 μm.

8. The gas sensitive device containing a composite getter system according to claim 1, wherein said at least one NEG material is in a form of a film with a thickness comprised between 0.5 μm and 300 μm.

9. The gas sensitive device containing a composite getter system according to claim 8, wherein said at least one NEG film thickness is comprised between 1 μm and 200 μm.

10. The gas sensitive device containing a composite getter system according to claim 1, wherein said at least one NEG material comprises at least one of Zr, Ti, Y, or their combinations and alloys.

11. The gas sensitive device containing a composite getter system according to claim 10, wherein:
    said at least one NEG material comprises combinations and alloys of Zr, Ti, Y with one of more of V, Al, Ni, Fe, Si, Sb, Co, and Mn; and a weight ratio of at least one of Zr, Ti, and Y is equal or higher than 20 wt %.

12. The gas sensitive device containing a composite getter system according to claim 10, wherein said at least one NEG material has an activation temperature equal to or lower than 450° C.

13. The gas sensitive device containing a composite getter system according to claim 12, wherein said at least one NEG material has an activation temperature equal to or lower than 450° C. and comprise zirconium combinations and alloys comprising:
   at least 50 wt % Zr when the at least one NEG material alloy is a binary alloy or combination; and
   at least 20 wt % Zr when the at least one NEG material contains three or more elements.

14. The gas sensitive device containing a composite getter system according to claim 13, wherein said at least one NEG material at least 5 wt % of one element chosen from Co, Fe, and V.

15. The gas sensitive device containing a composite getter system according to claim 14, wherein said at least one NEG material comprises at least 1 wt % mischmetal (MM).

16. The gas sensitive device containing a composite getter system according to claim 1, wherein said gas sensitive device is sealed under vacuum.

17. The gas sensitive device containing a composite getter system according to claim 1, wherein said gas sensitive device is sealed in an inert gas atmosphere.

18. The gas sensitive device containing a composite getter system according to claim 1, further comprising a pressure within the device is at least 100 mbar lower than the atmospheric pressure.

\* \* \* \* \*